United States Patent
Yamada

(10) Patent No.: US 7,290,032 B2
(45) Date of Patent: Oct. 30, 2007

(54) BROADCAST COMMUNICATION SYSTEM AND METHOD THEREOF IN A POINT-TO-MULTIPORT COMMUNICATION SYSTEM

(75) Inventor: Kouichi Yamada, Tokyo (JP)

(73) Assignee: NEC Corporation, Tokyo (JP)

(*) Notice: Subject to any disclaimer, the term of this patent is extended or adjusted under 35 U.S.C. 154(b) by 1249 days.

(21) Appl. No.: 09/978,688

(22) Filed: Oct. 18, 2001

(65) Prior Publication Data

US 2002/0062335 A1 May 23, 2002

(30) Foreign Application Priority Data

Oct. 19, 2000 (JP) .............................. 2000-318890

(51) Int. Cl.
*G06F 15/16* (2006.01)

(52) U.S. Cl. ................... 709/204; 709/205; 709/217; 709/218; 709/219

(58) Field of Classification Search ................ 709/204, 709/205, 217–219
See application file for complete search history.

(56) References Cited

U.S. PATENT DOCUMENTS

| | | | | |
|---|---|---|---|---|
| 5,335,277 A | * | 8/1994 | Harvey et al. ............... 380/242 |
| 5,440,615 A | * | 8/1995 | Caccuro et al. ........... 379/88.06 |
| 5,513,384 A | * | 4/1996 | Brennan et al. .......... 455/180.1 |
| 5,778,380 A | * | 7/1998 | Siefert .................... 707/103 R |
| 5,841,852 A | * | 11/1998 | He ......................... 379/207.15 |
| 5,875,422 A | * | 2/1999 | Eslambolchi et al. ........... 704/3 |
| 5,887,243 A | * | 3/1999 | Harvey et al. ............... 725/136 |
| 5,895,903 A | * | 4/1999 | Abe et al. ..................... 235/380 |
| 6,078,804 A | * | 6/2000 | Alperovich et al. ...... 455/404.1 |
| 6,385,542 B1 | * | 5/2002 | Millington .................... 701/213 |
| 6,469,713 B2 | * | 10/2002 | Hetherington et al. ....... 715/740 |
| 6,661,466 B1 | * | 12/2003 | Kou ............................ 348/553 |
| 2002/0002452 A1 | * | 1/2002 | Christy et al. .................. 704/3 |
| 2002/0054097 A1 | * | 5/2002 | Hetherington et al. ....... 345/762 |
| 2005/0080615 A1 | * | 4/2005 | Huang et al. ................... 704/9 |
| 2005/0100153 A1 | * | 5/2005 | Pines et al. ............ 379/218.01 |
| 2005/0136899 A1 | * | 6/2005 | Pines et al. ............... 455/414.1 |
| 2005/0136916 A1 | * | 6/2005 | Pines et al. ................. 455/428 |
| 2005/0288013 A1 | * | 12/2005 | Pines et al. ............... 455/432.3 |

FOREIGN PATENT DOCUMENTS

| | | |
|---|---|---|
| JP | 4-179399 | 6/1992 |
| JP | 11-98434 | 4/1999 |
| JP | 11-196087 | 7/1999 |
| JP | 2000-216892 | 8/2000 |
| WO | WO9302433 A1 * | 2/1993 |

* cited by examiner

Primary Examiner—Nathan J. Flynn
Assistant Examiner—Mohamed Wasel
(74) Attorney, Agent, or Firm—Young & Thompson

(57) ABSTRACT

In a point-to-multipoint system, the first communication processing apparatus generates a signal to inquire of the second communication processing apparatus about languages used in the second terminals and transmits the signal to the second communication processing apparatus. The second communication processing apparatus generates a second signal which includes data indicating the language which is used most in the second terminals and transmits the second signal to the first communication processing apparatus.

6 Claims, 11 Drawing Sheets

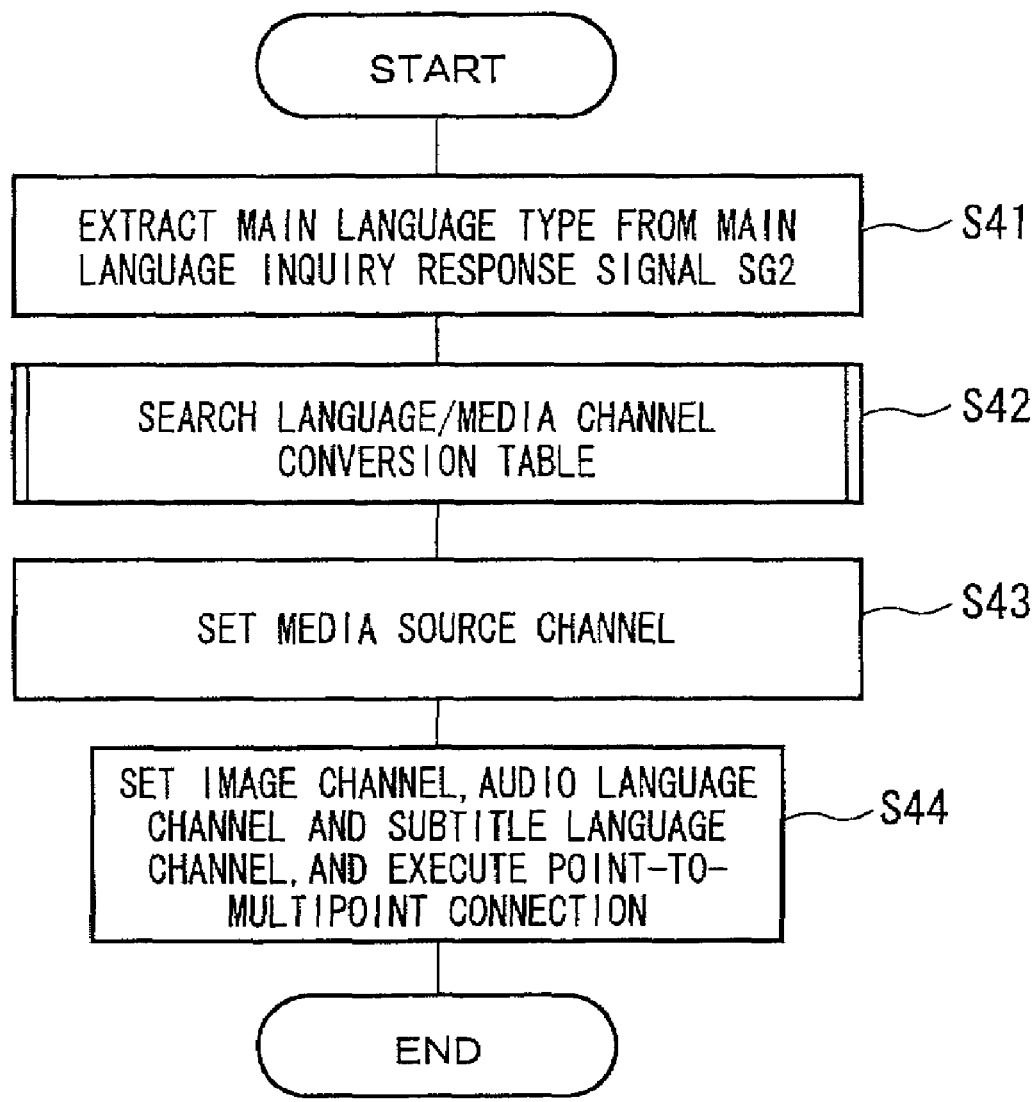

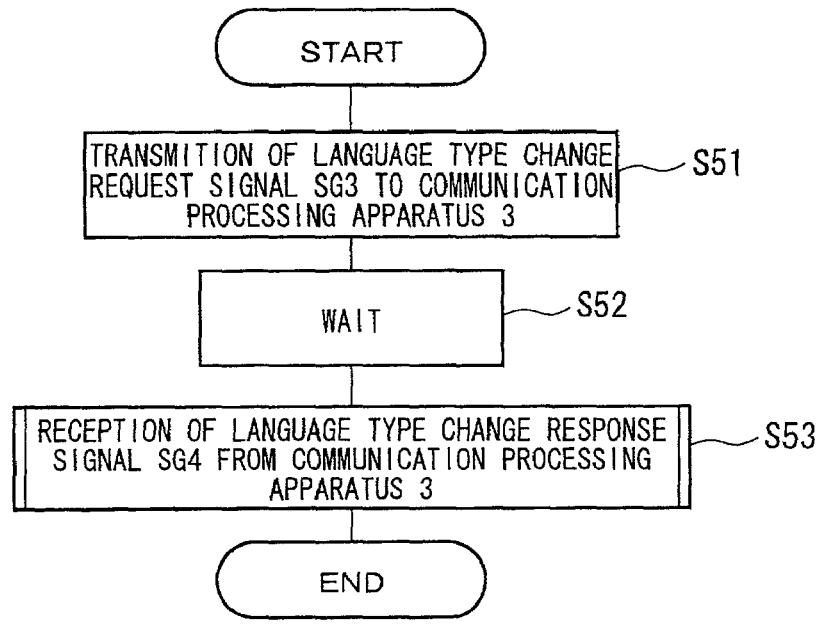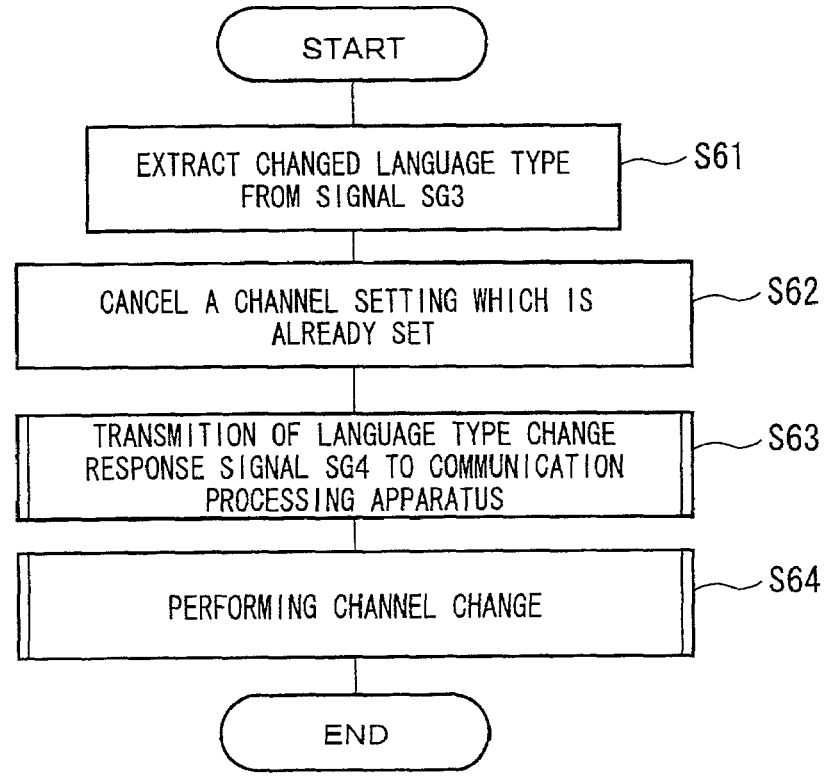

BROADCAST COMMUNICATION SYSTEM AND METHOD THEREOF IN A POINT-TO-MULTIPORT COMMUNICATION SYSTEM

BACKGROUND OF THE INVENTION

1. Field of the Invention

The present invention relates to a language selection system and method thereof in a point-to-multipoint communication system and more particularly to a traffic control in a point-to-multipoint communication system having a language selection system.

2. Related Art

In the past, in a point-to-multipoint communication system or a broadcast communication system in which desired information is transmitted to a plurality of terminals (destination terminals), the desired information is generally transmitted in one and the same language. The above-noted system, however, cannot accommodate the case in which the languages used among a plurality of destination terminals differ.

In the field of automatic broadcasting apparatuses which provide flight information to travelers at an airport or the like, there is a known broadcast apparatus as disclosed in the Japanese Unexamined Patent Publication (KOKAI) No.04-179399, this apparatus having means for selecting a language in response to a number of travelers for each nationality, and means for outputting voice flight information based on the above-noted selected language.

When this apparatus is applied to the above-noted point-to-multipoint communication system, the problem of not being able to understand necessary information because of the differences in the languages being used can be greatly reduced.

In a system as described above, however, if the communication destination terminal user does not select a language, it is not possible to establish language information (media) for the most distant point branching. The expression "the most distant point branching" in the case of a point-to-multipoint communication system means the sharing of information (media) or a channel for passing this information as close as possible to a destination terminal from an information transmitting terminal (often a request terminal) for the purpose of saving hardware resources used up until the destination terminal, performing branching at the minimum essential parts. In this case, because the branching point is at a point that is as far away as possible from the information transmitting terminal, this is referred to as the most distant point branching, seen from the information transmitting terminal.

For example, as shown in FIG. 15 of the accompanying drawings, in the case of making a point-to-multipoint transmission from a terminal 21, which is an information transmitting terminal, with the transmission channel branched into three channels, passing through stations A and B, to reach the destination terminals 221, 22-2, and 223, branching is done at station A as shown in FIG. 16, and at station B as shown in FIG. 17. In this case, because the station B is closer to the destination terminals 22-1, 22-2, and 22-3 than the station A, "the most distant point branching" is performed at the station B as shown in FIG. 17.

In this manner, in the above-described system, there is the problem that the probability of selecting a language suitable for a destination terminal is not high. In the above-noted system, there is additionally the problem that it is not possible to establish the point-to-multipoint information (the media for most distant point branching) to be simultaneously shared.

Accordingly, in consideration of the above-noted drawbacks, it is an object of the present invention to provide a language selection system and method thereof in a point-to-multipoint communication system, capable of improving the service provided to destination terminals.

SUMMARY OF THE INVENTION

In order to achieve the above-noted objects, the present invention adopts the following basic technical constitution.

Specifically, a first aspect of the present invention is a broadcast communication system in which a prescribed information is transmitted from a first terminal to a plurality of second terminals via a first communication processing apparatus and a second communication processing apparatus, and the first terminal is connected to the first communication processing apparatus, and the second terminal is connected to the second communication processing apparatus, the broadcast communication system comprising: a plurality of information outputting apparatuses which are provided in the first terminal and output information to be performed broadcast communication from the first terminal to the plurality of second terminals and each information output from the information outputting apparatus having same contents and having different language each other, a first means, provided in the first communication processing apparatus, for generating a first signal to inquire of the second communication processing apparatus about languages used in each second terminal and transmitting the first signal to the second communication processing apparatus, when the first communication processing apparatus receives from the first terminal a request to perform a broadcast communication between the first terminal and the plurality of second terminals, a second means, provided in the second communication processing apparatus, for generating a second signal which includes data indicating language which is used in the each second terminal and transmitting the second signal to the first communication processing apparatus, when the second communication processing apparatus receives the first signal from the first communication processing apparatus, and a third means, provided in the first communication processing apparatus, for establishing connection between the first communication processing apparatus and the second communication processing apparatus so as to perform broadcast communication between the second terminal and the output apparatus of the first terminal which uses language specified by the second signal, when the first communication processing apparatus receives the second signal from the second communication processing apparatus.

The second aspect of the present invention is the broadcast communication system having a fourth means, provided in the first communication processing apparatus, for establishing a plurality of connections between the first communication processing apparatus and the plurality of information output apparatuses of the first terminal, when the first communication processing apparatus receives from the first terminal a request to perform a broadcast communication between the first terminal and the plurality of second terminals.

In the third aspect of the present invention, the data indicating language which is used in the each second terminal is automatically selected from data provided in the second communication processing apparatus.

In the fourth aspect of the present invention, the data indicating language which is used in the each second terminal is specified by the second terminal.

In the fifth aspect of the present invention, language selected by the second communication processing apparatus is language that is used a maximum number of times among the number of used times counted for each language.

BRIEF DESCRIPTION OF THE DRAWINGS

FIG. 9 is a flowchart illustrating the operation of the block B3 shown in FIG. 2.

FIG. 10 is a flowchart illustrating the operation of the block B7 shown in FIG. 3.

FIG. 11 is a flowchart illustrating the operation of the block B6 shown in FIG. 3.

DETAILED DESCRIPTION OF THE PREFERRED EMBODIMENTS

Embodiments of the present invention are described in detail below, with references made to relevant accompanying drawings.

Figure 1:
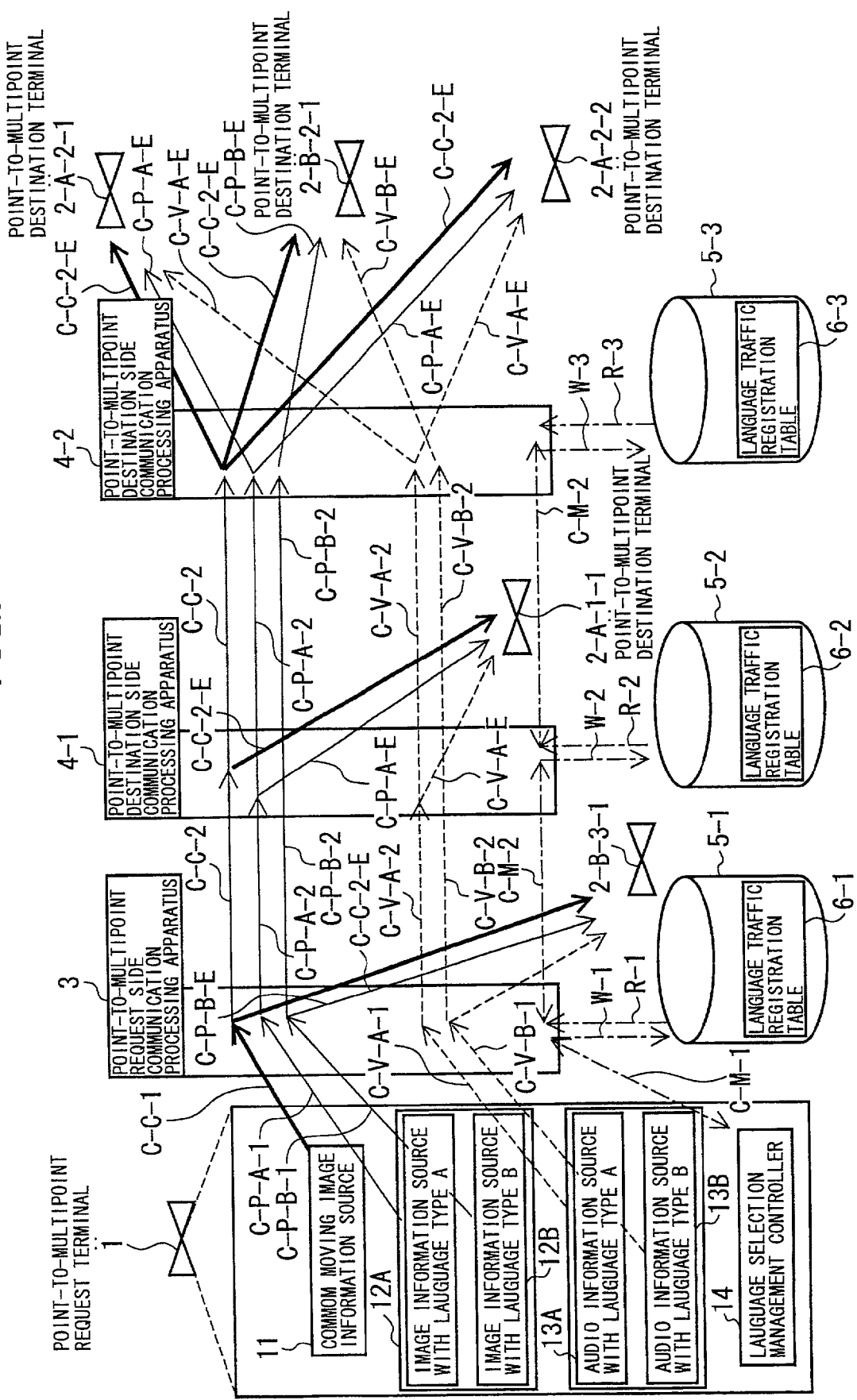
FIG. 1 is a drawing showing an embodiment of the present invention.
Figure 2:
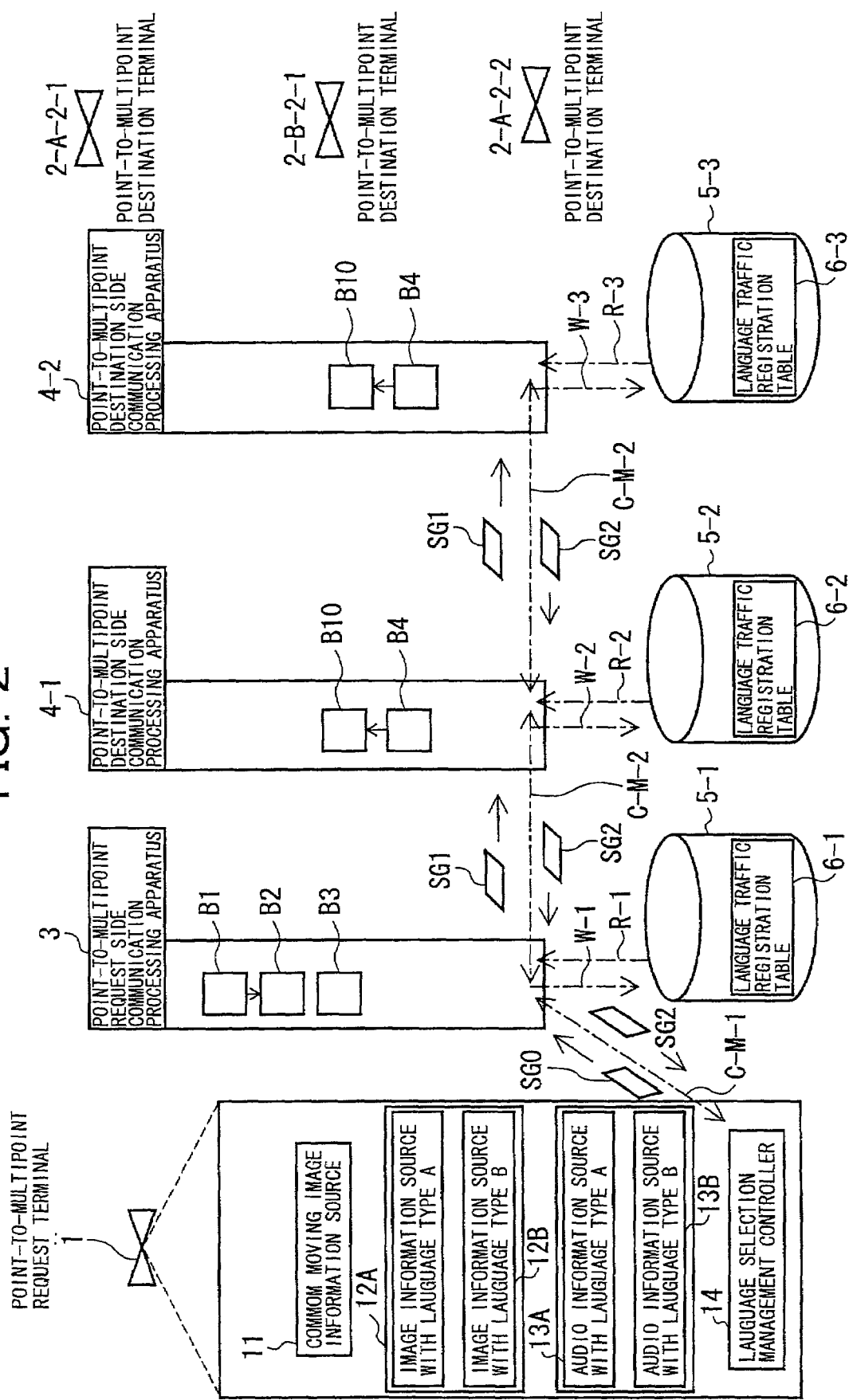
FIG. 2 is a drawing showing the operation of an embodiment of the present invention when the main language type is selected.
Figure 3:
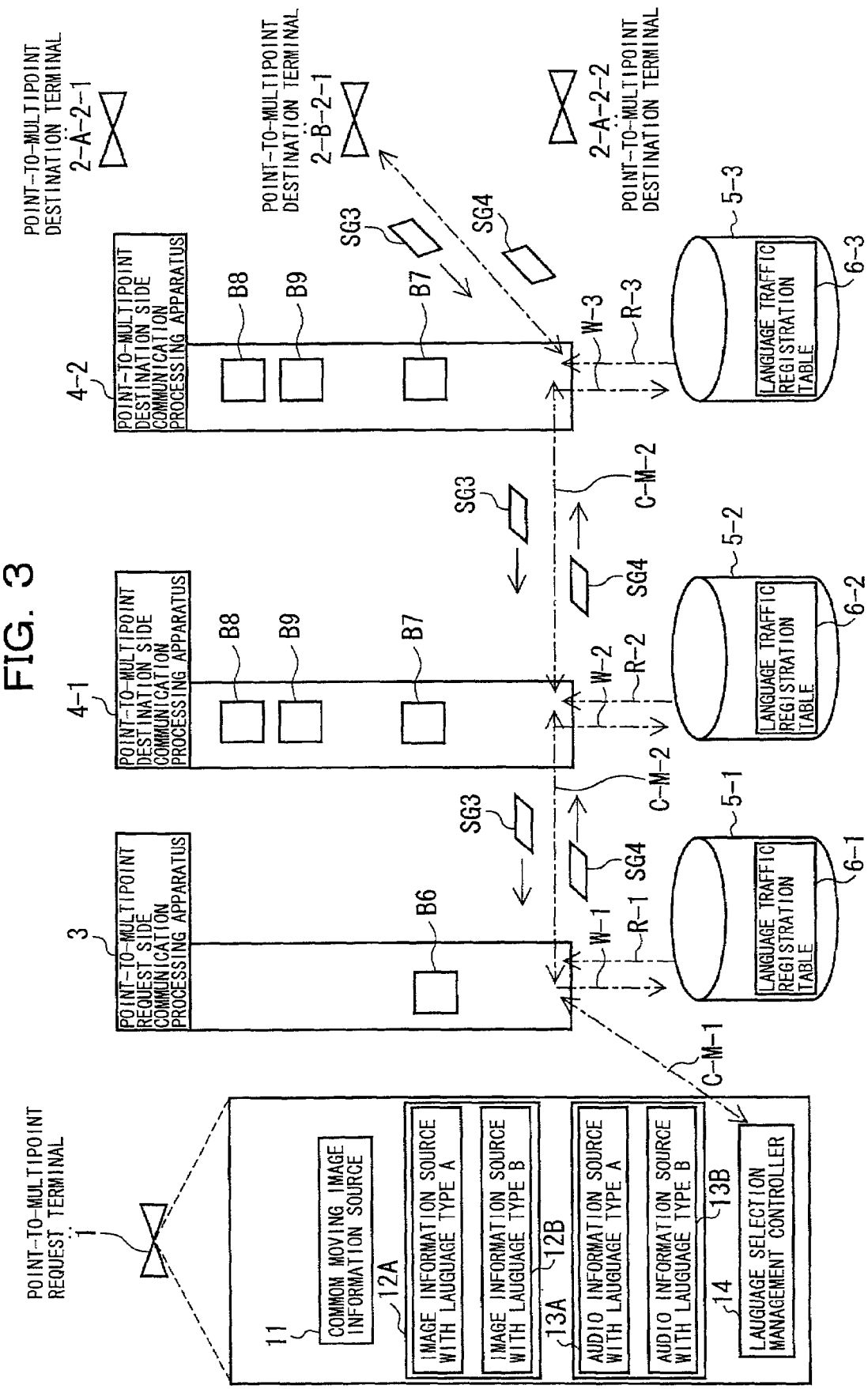
FIG. 3 is a drawing showing the operation of an embodiment of the present invention when language type is changed.

Specifically, FIG. 1 through FIG. 3 shows the configuration of an embodiment of a language selection system in a point-to-multipoint communication system or a broadcasting communication system according to the present invention. Of these drawings, FIG. 2 illustrates the operation of the embodiment when main language selection is performed and FIG. 3 illustrates the operation of the embodiment when main language type is changed, with similar elements in these drawings assigned the same reference numerals. FIG. 2 shows only the blocks used in main language selection, and FIG. 3 shows only the blocks used in language type change processing.

As shown in FIG. 1 through FIG. 3, the system of the present invention has a point-to-multipoint request terminal 1, point-to-multipoint destination terminals 2-A-2-1, 2-A-2-2, 2-B-2-1 and so on, which receive a point-to-multipoint communication message, a communication processing apparatus 3, which receives a point-to-multipoint service output from the point-to-multipoint request terminal 1, communication processing apparatuses 4-1, 4-2 and so on, which perform point-to-multipoint communication processing for point-to-multipoint destination terminals, and data storage apparatuses 5-1, 5-2, and 5-3 for the communication processing apparatus 3, communication processing apparatuses 4-1, 4-2, respectively.

In this configuration, the point-to-multipoint destination terminal 2-A-2-1 chiefly uses language type A, and is the first terminal connected to the communication processing apparatus 4-2, the point-to-multipoint destination terminal 2-A-2-2 chiefly uses language type A, and is the second terminal connected to the communication processing apparatus 4-2, the point-to-multipoint destination terminal 2-B-2-1 chiefly uses language type B, and is the first terminal connected to the communication processing apparatus 4-2. The point-to-multipoint destination terminal 2-B-3-1 shown in FIG. 1 chiefly uses language type B and is the first terminal connected to the communication processing apparatus 3, and the point-to-multipoint destination terminal 2-A-1-1 chiefly uses the language type A and is the first terminal connected to the communication processing apparatus 4-1. As will be described below, the languages used can be changed or selected at arbitrary times.

The point-to-multipoint request terminal 1 has a common moving image information source 11, an image information source 12A with the language type A, an image information source 12B with the language type B, an audio information source 13A with the language type A, an audio information source 13B with the language type B, and a language selection management controller 14. Referring to FIG. 2 and FIG. 3, the point-to-multipoint request terminal side processing apparatus 3 has a point-to-multipoint processing block B1, a main language inquiry block B2, a inquiry response signal processing block B3, and a language type change processing block B6.

Each of the destination terminal side communication processing apparatuses 4-1 and 4-2 has a main language inquiry signal processing block B4, a language type change processing block B7, a point-to-multipoint processing block B8, a traffic collection block B9, and a main language selection block B10, respectively. Additionally, the data storage apparatuses 5-1, 5-2, and 5-3 are provided with language traffic registration tables 6-1, 6-2, and 6-3, respectively. Additionally, in FIG. 1 through FIG. 3 R-i (where i=1, 2, 3) shows the traffic reading operations for the language used in the communication processing apparatuses 3, 4-1 and 4-2, and the W-i (where i=1, 2, 3) shows the traffic writing operations for the language used in the communication processing apparatuses 3, 4-1 and 4-2, respectively.

The operation of this embodiment of the present invention is as follows.

First, as shown in FIG. 2, the language selection management controller 14 provided within the point-to-multipoint request terminal 1 transmits a point-to-multipoint communication request signal SG0, the point-to-multipoint communication request signal SG0 being accepted by the communication processing apparatus 3 via a logical connection C-M-1. In this case, the point-to-multipoint communication request signal SG0 is received by the point-to-multipoint processing block B1 of the communication processing apparatus 3. As the result, a main language inquiry block B2 is launched and performs main language inquiry signal transmission processing (step S1).

Figure 5:
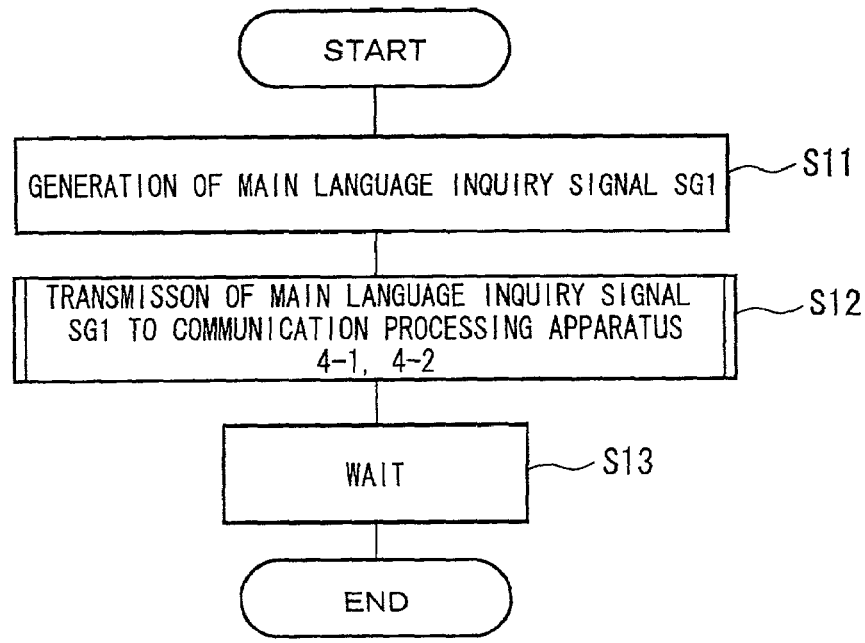
FIG. 5 is a flowchart illustrating the operation of the block B2 shown in FIG. 2.

The flowchart of the main language inquiry signal transmission processing (step S1) is shown in FIG. 5.

When the main language inquiry block B2 is launched at step S1, operation as shown in the flowchart of FIG. 5 is performed. First, the main language inquiry signal SG1 is generated (step S11), then, the main language inquiry signal SG1 is transmitted (step S12). After this, the wait processing is performed (step S13), after which the processing ends. When a processing of the step S13 ends, the processing returns to the point-to-multipoint processing block B1.

Figure 4:
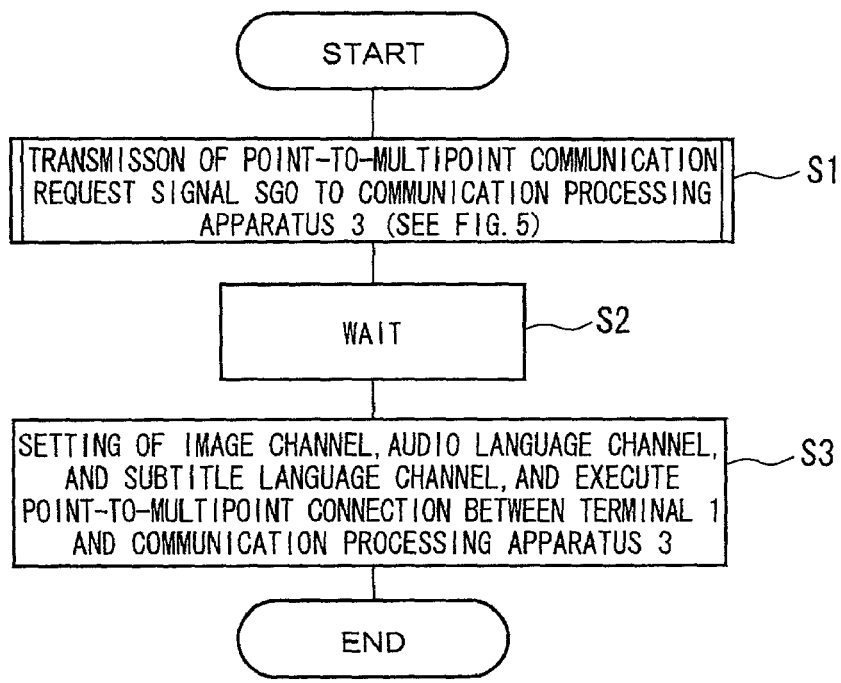
FIG. 4 is a flowchart illustrating the operation of the block B1 shown in FIG. 2.

After execution of transmission of the above-noted main language inquiry signal SG1, the point-to-multipoint processing block B1 performs a wait processing (step S2 in FIG. 4). After this, the image channel, the audio channel, and the subtitle channel are set between the communication processing apparatus 3 and the point-to-multipoint request terminal 1, and point-to-multipoint connection is executed (step S3 in FIG. 4).

The operation between the communication processing apparatus 3 and the destination communication processing apparatuses 4-1 and 4-2 is as follows. The main language inquiry signal SG1, transmitted from the communication processing apparatus 3 based on the control by the main language inquiry block B2, is received by the communication processing apparatuses 4-1 and 4-2, via the logical connection C-M-2, which joins the communication processing apparatus 3 with the communication processing apparatuses 4-1 and 4-2. The communication processing apparatuses 4-1 and 4-2 receive and process the main language inquiry signal SG1 in the main language inquiry signal processing block B4 provided in the communication processing apparatuses 4-1 and 4-2.

Figure 6:
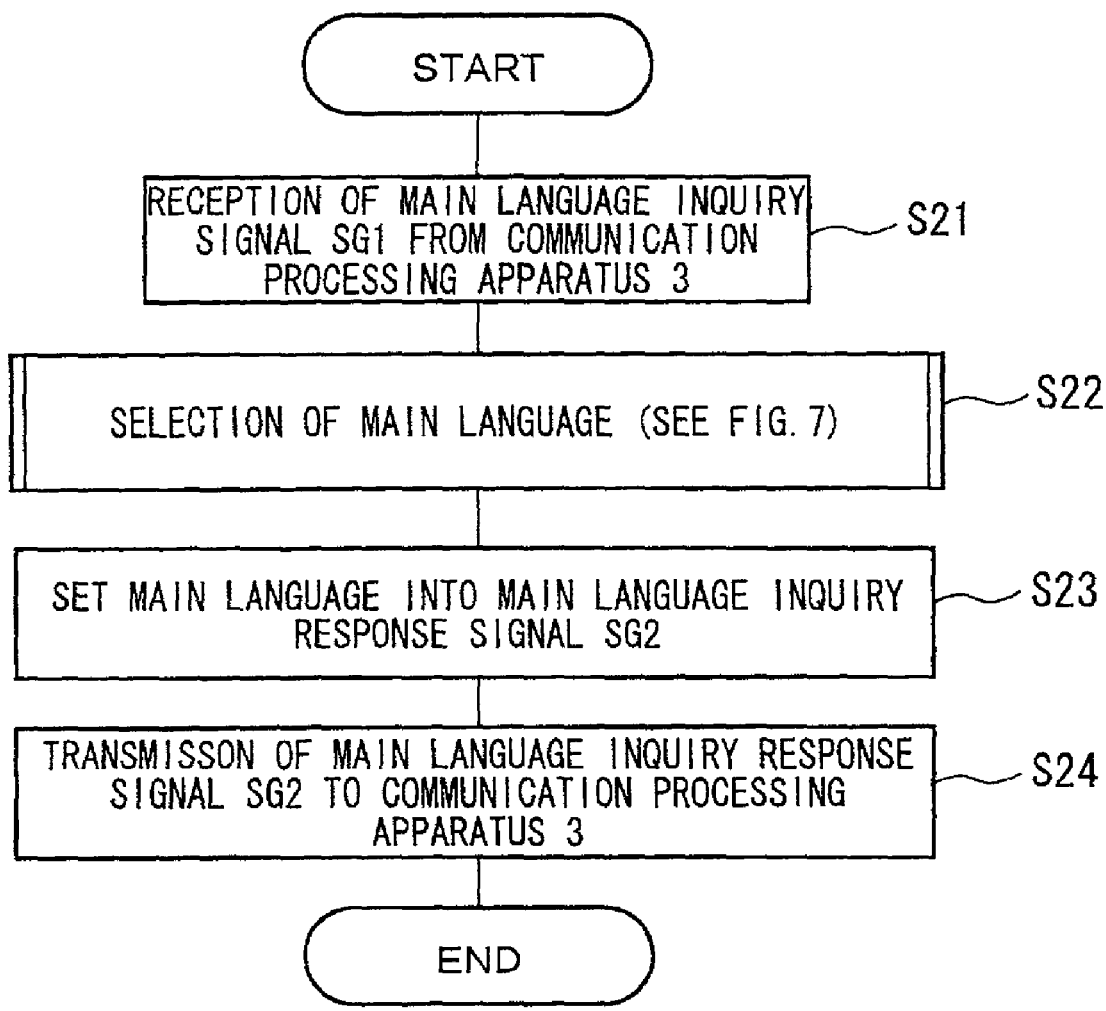
FIG. 6 is a flowchart illustrating the operation of the block B4 shown in FIG. 2.
Figure 7:
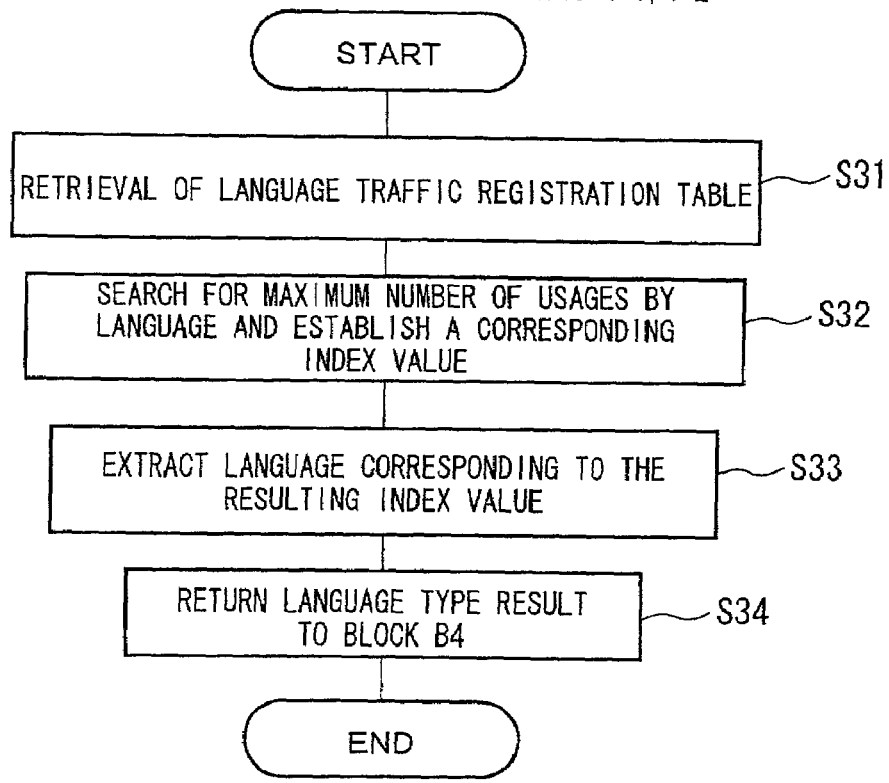
FIG. 7 is a flowchart showing the operation of the block B10 shown in FIG. 2.

Referring to the flowchart of FIG. 6, the operation of the main language inquiry signal processing block B4 is as follows. First, when receiving the main language inquiry signal SG1 (step S21), the main language selection block B10 shown in FIG. 2 is launched (step S22). The operation of the main language selection block B10 is illustrated in the flowchart of FIG. 7. When the main language selection block B10 is launched, first the language traffic registration tables 6-2 and 6-3 stored in the data storage apparatuses 5-2 and 5-3 are retrieved (step S31).

Next, a search is made for the maximum number of usages with respect to language types used, and the corresponding index value obtained (step S32). This number of usages refers to the number of usages and counted for each language set for either calls or service provided. Next, the language corresponding to the index value is established (step S33), the language type of the main language is returned to the main language inquiry signal processing block B4 (step S34), and the processing ends.

That is, the main language selected by the main language selection block B10 is the language which has the greatest frequency of usage among the languages used by the point-to-multipoint destination side communication processing apparatuses 4-1 and 4-2 or, stated in different terms, the language which has the greatest frequency of usage is the language which is selected by the communication processing apparatuses 4-1 and 4-2, when these point-to-multipoint destination terminals 2-A-2-1, 2-A-2-2 and 2-B-2-1 do not select a language.

Figure 8:
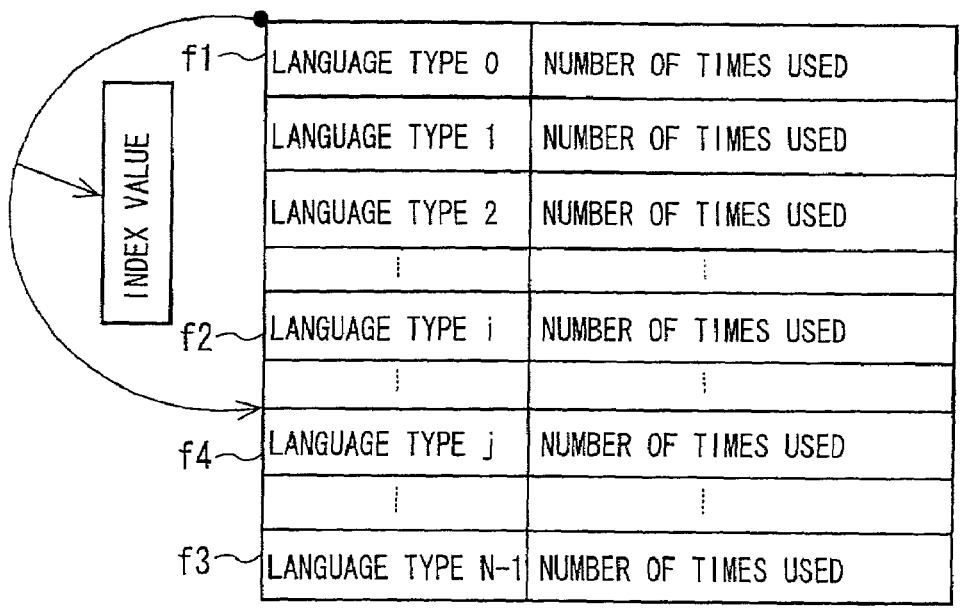
FIG. 8 is a drawing showing an example of the construction of a language traffic registration table.

FIG. 8 shows the construction of a language traffic registration table retrieved at step S31. In this drawing, f1 is the 0th registered language (type 0) and the number of times the language type 0 is used, f2 is the i-th registered language (type I) and the number of times the language type i is used, f3 is the (N−1)th registered language (type N−1) and the number of times the language type N−1 is used, and f4 is the j-th registered language (type j) and the number of times the language type j is used.

Returning to FIG. 6, the operation of the main language inquiry signal processing block B4 is as follows. When the main language inquiry signal processing block B4 receives the selected language data based on the execution at the steps S31-S34 of the main language selection block B10 shown in FIG. 7 (step S22), the main language inquiry signal processing block B4 sets the main language of the selected type into a main language inquiry response signal SG2 (step S23). The main language inquiry response signal SG2 is then transmitted to the communication processing apparatus of the requester (step S24). By doing this, the main language inquiry response signal SG2 is received by the point-to-multipoint request communication processing apparatus 3 via a logical connection C-M-2 that joins the communication processing apparatuses in FIG. 2, and further is transmitted to the point-to-multipoint request terminal 1.

The inquiry response signal processing block B3 provided within the communication processing apparatus 3 performs the processing shown in the flowchart of FIG. 9. In the inquiry response signal processing block B3, when the this block B3 receives the main language inquiry response signal SG2, it extracts a main language type from the received main language inquiry response signal SG2 (step S41).

Then, based on the extracted main language type, the language/media channel conversion table stored in the communication processing storage apparatus 5-1 of the communication processing apparatus 3 is searched (step S42), and a media source channel corresponding to the main language type is set (step S43). Next, based on the set media source channel, an image channel, an audio channel, and a subtitle channel are set, and a point-to-multipoint connection is executed between the destination side communication processing apparatus which output the main language inquiry response signal SG2 and the point-to-multipoint request terminal 1 (step S44).

By doing the above, as shown in FIG. 1, image information of the language B output from the image information source 12B provided in the point-to-multipoint request terminal 1 is sent to the destination terminal 2-B-3-1 via the logical connections C-P-B-1 and C-P-B-E, and audio information of the language B output from the audio information source 13B provided in the point-to-multipoint request terminal 1 is sent to the destination terminal 2-B-3-1 via the logical connection C-V-B-1. In addition, image information and audio image information output from the point-to-multipoint request terminal 1 are transmitted to other point-to-multipoint destination terminals using the language A or the language B as their main languages via each of the logic connections.

Because the common moving image information output from the common moving image information source 11 provided in the point-to-multipoint request terminal 1 is image information not having an relation to the language used, the common moving image information is sent to all point-to-multipoint destination terminals as point-to-multipoint information in common via the logical connections C-C-1 and C-C-2. That is, information which is sent to all point-to-multipoint destination terminals is one and the same content, However, the image information and the audio information with language information, the content of which is affected by the language used, are each sent to each of the point-to-multipoint destination terminals in the main languages of these terminals, with common information not affected by the language used being transmitted in common to all the point-to-multipoint destination terminals.

As can be understood from FIG. 1, the point-to-multipoint destination terminal which uses language A as the main language is not connected to the communication processing apparatus 3, and the terminal 2-A-1-1 which uses language A as the main language is connected to the communication processing apparatus 4-1, which is farther away from the communication processing apparatus 3 with respect to the point-to-multipoint request terminal 1. For this reason, image information and audio information with language A are not branched at the communication processing apparatus 3, but are branched at the communication processing apparatus 4-1 at the most distant point, so that image information and audio information with language A are sent to the point-to-multipoint destination terminal 2-A-1-1 via the logical connections C-P-A-E and C-V-A-E, respectively. In FIG. 1 through FIG. 3, C-M-i (where i=1 to 2) indicates a logical connection provided for the purpose of control signal transmission.

The operation when the selected language is changed is described below, with reference being made chiefly to FIG. 3. As shown in FIG. 3, when the communication processing apparatus 4-2 receives a language type change request signal SG3 from the terminal 2-B-2-1, the destination side language type change processing block B7 is launched, and the processing shown in the flowchart of FIG. 10 is executed.

The operation of the destination side language type change processing block B7 is as follows.

First, the destination side language type change processing block B7 transmits the received language type change request signal SG3 to the point-to-multipoint instruction side communication processing apparatus 3 (step S51). Upon receiving the language type change request signal SG3 via a logical connection C-M-2 as shown in FIG. 3, the point-to-multipoint instruction side communication processing apparatus 3 launches the language type change processing block B6, the instruction side language change processing is performed in accordance with the flowchart of FIG. 11. In the language type change processing block B6, first, a desired language type is extracted from the received language type change request signal SG3 (step S61), and the channel setting data for the corresponding language type is extracted (step S62) and, based on these data, the language type change processing block B6 generates a language type change response signal SG4, which includes information with regard to the channel information corresponding to the language type after the change, this signal being returned to the communication processing apparatus 4-2 (step S63), a channel change corresponding the requested language is performed (step S64).

The destination side language type change processing block B7 within the destination side communication processing apparatus 4-2, after transmission of the language type change request signal SG3 at step S51 of FIG. 10, a wait is made for reception of a language type change response signal SG4 (step S52 in FIG. 10), and when the above-noted language type change response signal SG4 is received from the point-to-multipoint instruction side communication processing apparatus 3 (step S53), the language type change processing of the communication processing apparatus 4-2 is ended. By doing this, the language type of the point-to-multipoint destination terminal connected to the communication processing apparatuses 4-1 and 4-2 can be changed to a desired language type at any desired arbitrary time.

Figure 12:
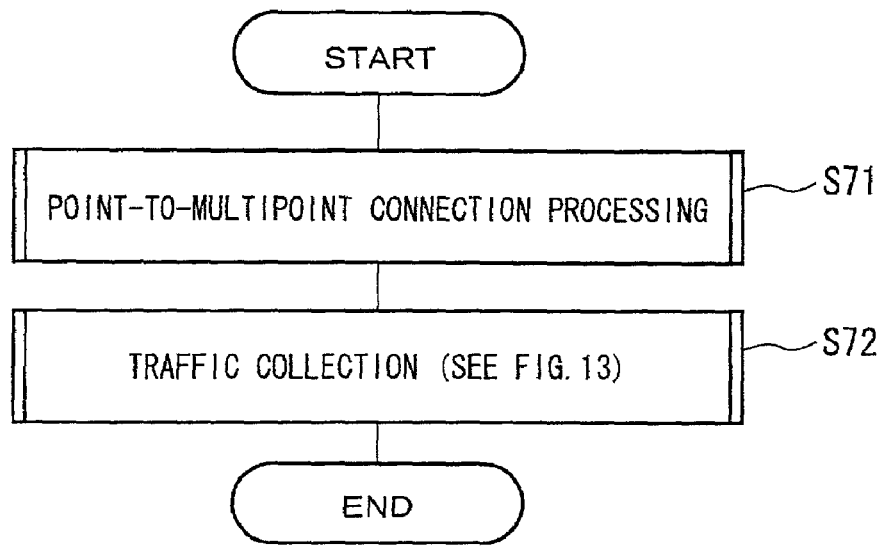
FIG. 12 is a flowchart illustrating the operation of the block B8 shown in FIG. 3.
Figure 13:
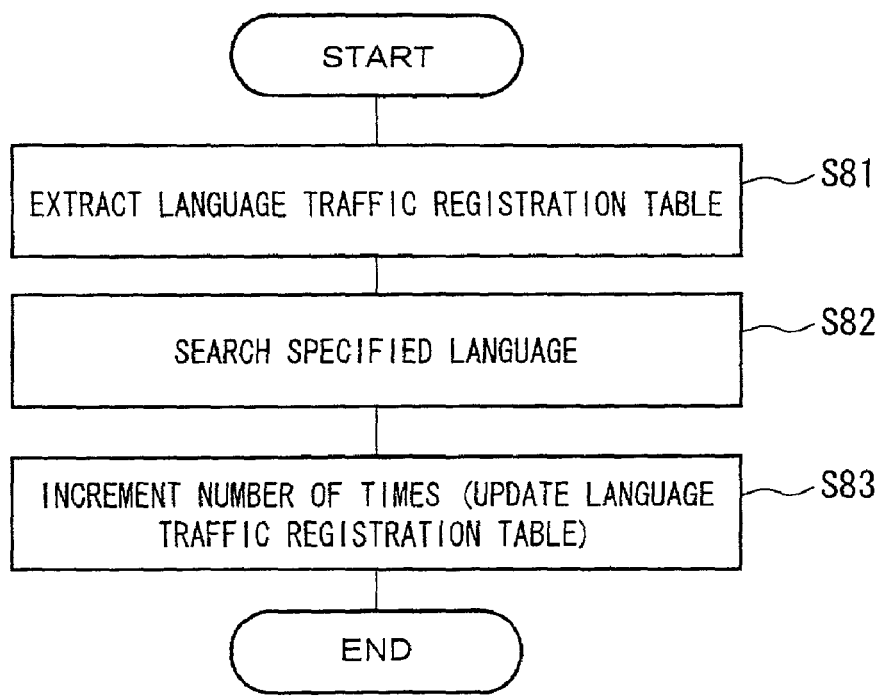
FIG. 13 is a flowchart illustrating the block B9 shown in FIG. 3.
Figure 14:
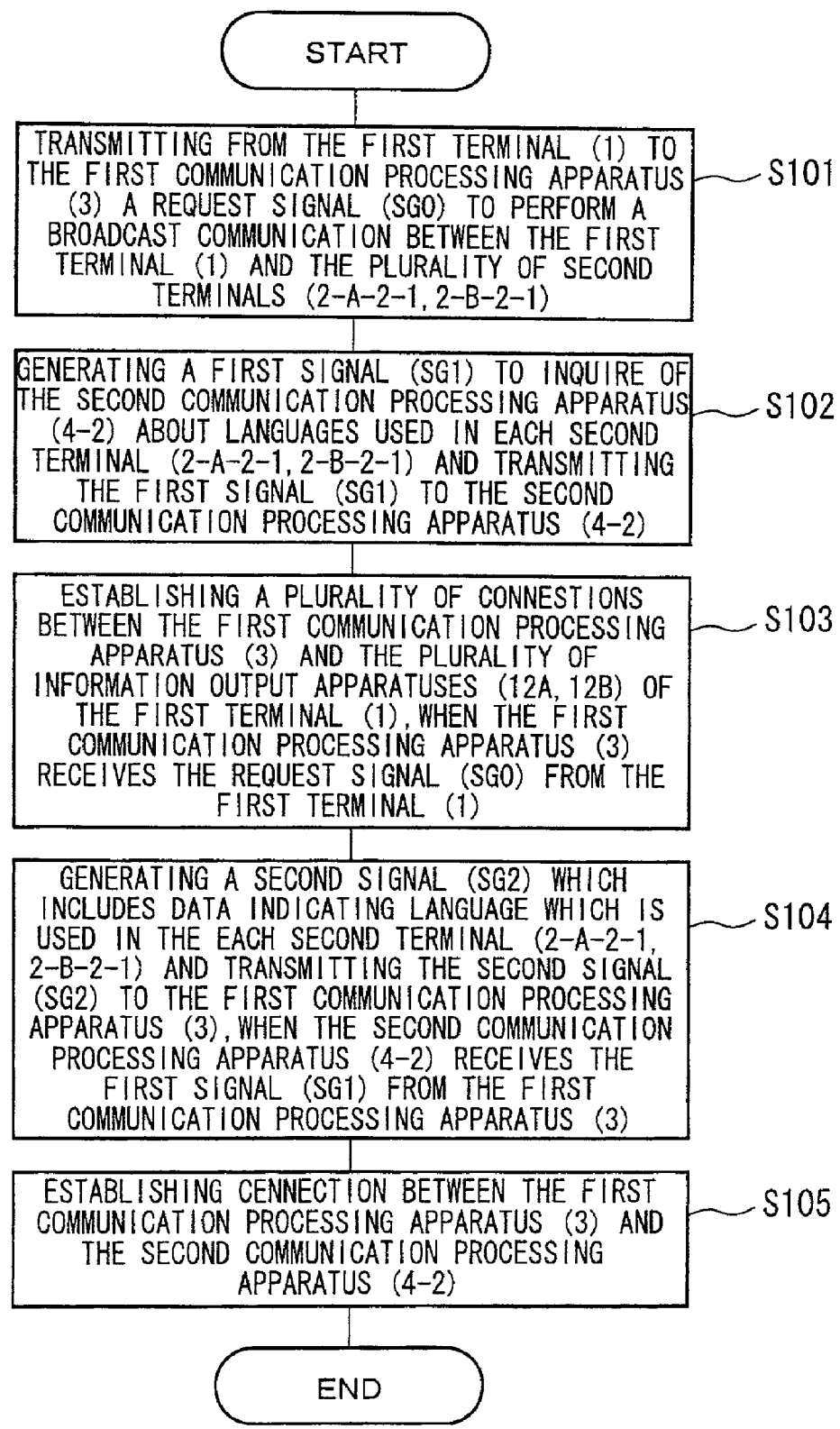
FIG. 14 is a flowchart illustrating the present invention.
Figure 15:
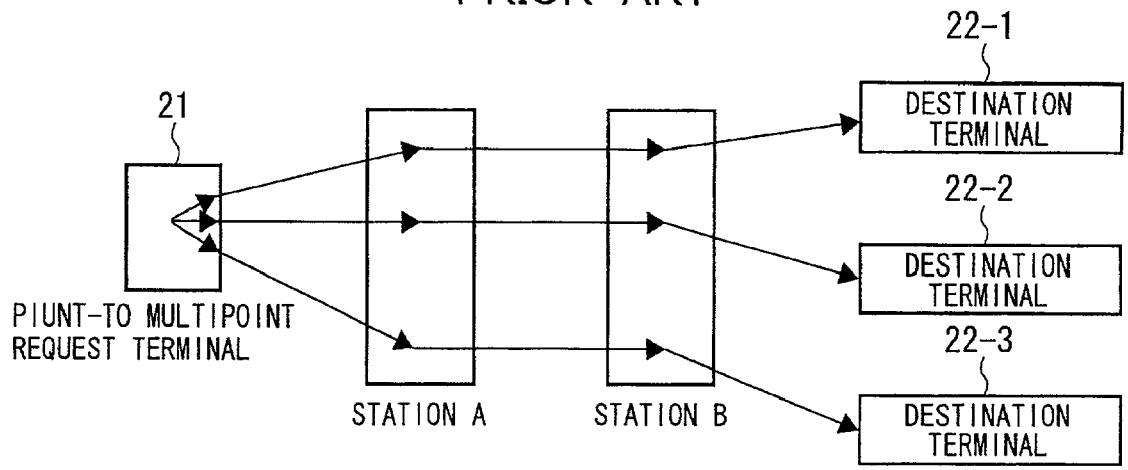
FIG. 15 is a drawing illustrating the most distant point branching.
Figure 16:
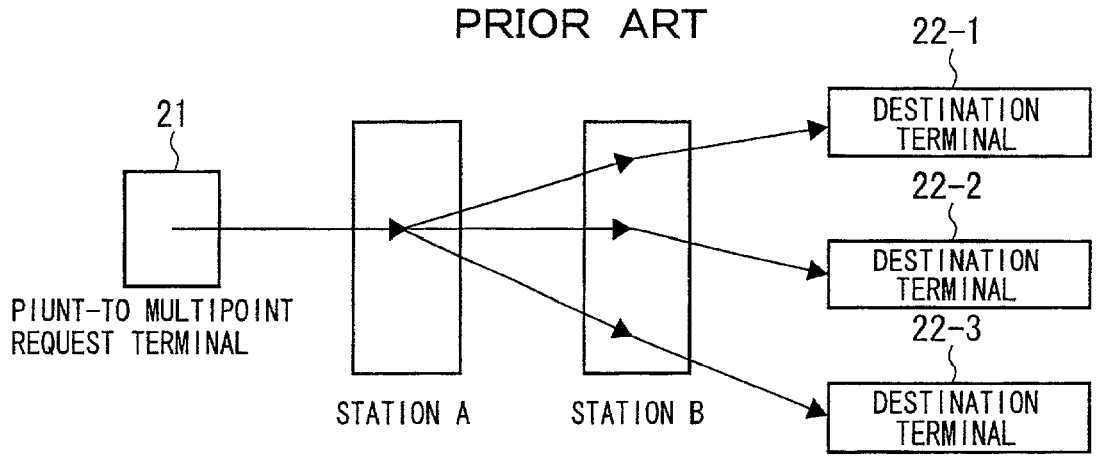
FIG. 16 is a drawing illustrating the most distant point branching.
Figure 17:
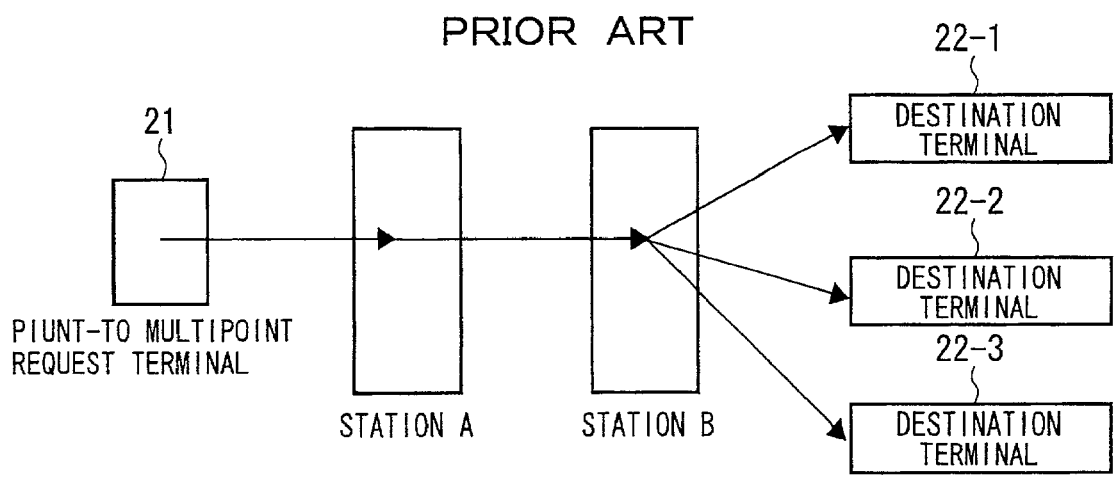
FIG. 17 is a drawing illustrating the most distant point branching.

Next, the language use traffic collection processing performed by the destination side point-to-multipoint processing block B8 is as follows. As shown in FIG. 12 and FIG. 13, after a point-to-multipoint connection processing is performed (step S71), the language use traffic collection block B9 provided in the communication processing apparatuses 4-1 or 4-2 is launched (step S72).

When the language use traffic collection block B9 is launched at step S72 of FIG. 12, as shown in the flowchart of FIG. 13, first the language traffic registration table is accessed (step S81), and a search is made of a specified language (step S82). Then the searched language type usage count is incremented by 1, and the language traffic registration table is updated (step S83).

As described above, a communication method using a broadcast communication system in which a prescribed information is transmitted from a first terminal 1 to a plurality of second terminals 2-A-2-1, 2-B-2-1 via a first communication processing apparatus 3 and a second communication processing apparatus 4-2 and said first terminal 1 is connected to said first communication processing apparatus 3, and said second terminal 2-A-2-1, 2-B-2-1 is connected to said second communication processing apparatus 4-2, and said first terminal 1 having a plurality of information outputting apparatuses 12A, 12B which output information to be performed broadcast communication from said first terminal 1 to said plurality of second terminals 2-A-2-1, 2-B-2-1 and each information output from said information outputting apparatus 12A, 12B having same contents and having different language each other, said method comprising the steps of: transmitting from said first terminal 1 to said first communication processing apparatus 3 a request signal SG0 to perform a broadcast communication between said first terminal 1 and said plurality of second terminals 2-A-2-1, 2-B-2-1 (step S101), generating a first signal SG1 to inquire of said second communication processing apparatus 4-2 about languages used in each second terminal 2-A-2-1, 2-B-2-1 and transmitting said first signal SG1 to said second communication processing apparatus 4-2, when said first communication processing apparatus 3 receives said request signal SG0 from said first terminal 1 (step S102), establishing a plurality of connections C-P-A-1, C-P-B-1 between said first communication processing apparatus 3 and said plurality of information output apparatuses 12A, 12B of said first terminal 1, when said first communication processing apparatus 3 receives said request signal SG0 from said first terminal 1 (step S103), generating a second signal SG2 which includes data indicating language which is used in said each second terminal 2-A-2-1, 2-B-2-1 and transmitting said second signal SG2 to said first communication processing apparatus 3, when said second communication processing apparatus 4-2 receives said first signal SG1 from said first communication processing apparatus 3 (step S104), and establishing connection C-P-A-2, C-P-B-2, C-V-A-2, C-V-B-2 between said first communication processing apparatus 3 and said second communication processing apparatus 4-2 so as to perform broadcast communication between said second terminal 2-A-2-1, 2-B-2-1 and said output apparatus 12A, 12B of said first terminal 1 which uses language specified by said second signal SG2, when said first communication processing apparatus 3 receives said second signal SG2 from said second communication processing apparatus 4-2 (step S105).

As described above, in the system of the present invention, the maximum traffic language for each point-to-multipoint destination terminal is automatically selected as the main language based on the past language usage traffic for each point-to-multipoint destination terminal and furthermore most distant point branching is performed in response to that main language, not only achieving an improvement in service, but also an improvement in the efficiency of network resource utilization.

While the foregoing embodiment of the present invention is described for the case in which there are two languages used, it will be understood that the present invention can be applied as well to the case of three or more languages being used. Additionally, it is alternatively possible to acquire a main language from a network traffic management station.

As described in detail above, according to the present invention even in the case in which either one of a first and a second point-to-multipoint destination terminal does not select a language type, by establishing a channel that enables reception of point-to-multipoint information of a main language type set as a default, it is possible to transmit point-to-multipoint information of a language that is suitable for the point-to-multipoint destination terminal, thereby improving the point-to-multipoint communication service.

Additionally, according to the present invention, because it is possible to determine a language media for calling connection to be branched at a most distant point, which is point-to-multipoint information to be simultaneously shared, it is possible to achieve efficient utilization of network resources.

Another effect of the present invention is that, by setting the main language for the first and second point-to-multipoint destination terminals as the language of greatest frequency of usages at those destination terminals, it is possible to predict the language type most likely to be suitable to users of those destination terminals, thereby enabling an increase in the convenience of the destination terminals.

What is claimed is:

1. A broadcast communication system in which a prescribed information is transmitted from a first terminal to a plurality of second terminals via a first communication processing apparatus and a second communication processing apparatus, and said first terminal is connected to said first communication processing apparatus, and said plurality of second terminals are connected to said second communication processing apparatus, said broadcast communication system comprising:
   a plurality of information outputting apparatuses that are provided in said first terminal and that output information to be communicated from said first terminal to said plurality of second terminals, and each said information that is output from said information outputting apparatuses having a same content and having different languages from each other;
   a first means, provided in said first communication processing apparatus, for generating a first signal to inquire of said second communication processing apparatus about the languages used in each of said plurality of second terminals and transmitting said first signal to said second communication processing apparatus, when said first communication processing apparatus receives from said first terminal a request to communicate between said first terminal and said plurality of second terminals;
   a second means, provided in said second communication processing apparatus, for generating a second signal which includes data indicating a one of the languages which is used most in said plurality of second terminals and transmitting said second signal to said first communication processing apparatus, when said second communication processing apparatus receives said first signal from said first communication processing apparatus; and
   a third means, provided in said first communication processing apparatus, for establishing a connection between said first communication processing apparatus and said second communication processing apparatus so as to communicate between said plurality of second terminals and respective ones of said plurality of information outputting apparatuses of said first terminal using the one of the languages specified by said second signal, when said first communication processing apparatus receives said second signal from said second communication processing apparatus.

2. The broadcast communication system according to claim 1, further comprising a fourth means, provided in said first communication processing apparatus, for establishing a plurality of connections between said first communication processing apparatus and said plurality of information outputting apparatuses of said first terminal, when said first communication processing apparatus receives from said first terminal a request to communicate between said first terminal and said plurality of second terminals.

3. The broadcast communication system according to claim 1, wherein said data indicating the language most used in said plurality of second terminals is automatically selected from data provided in said second communication processing apparatus.

4. The broadcast communication system according to claim 1, wherein said data indicating the language most used in said plurality of second terminals is specified by said second communication processing apparatus.

5. The broadcast communication system according to claim 3, wherein the language selected by said second communication processing apparatus is based on a count of a number of times each language is used in said plurality of second terminals.

6. A communication method using a broadcast communication system in which a prescribed information is transmitted from a first terminal to a plurality of second terminals via a first communication processing apparatus and a second communication processing apparatus, and said first terminal is connected to said first communication processing apparatus, and said plurality of second terminals are connected to said second communication processing apparatus, and said first terminal having a plurality of information outputting apparatuses which output information to be communicated from said first terminal to said plurality of second terminals and each said information that is output from said plurality of information outputting apparatuses having a same content and having different languages from each other, said method comprising the steps of:
   transmitting from said first terminal to said first communication processing apparatus a request signal to communicate between said first terminal and said plurality of second terminals;
   generating a first signal to inquire of said second communication processing apparatus about the languages used in each of said plurality of second terminals and transmitting said first signal to said second communication processing apparatus, when said first communication processing apparatus receives said request signal from said first terminal;
   establishing a plurality of connections between said first communication processing apparatus and said plurality of information output apparatuses of said first terminal, when said first communication processing apparatus receives said request signal from said first terminal;
   generating a second signal which includes data indicating a one of the languages which is used most in said plurality of second terminals and transmitting said second signal to said first communication processing apparatus, when said second communication processing apparatus receives said first signal from said first communication processing apparatus; and
establishing a connection between said first communication processing apparatus and said second communication processing apparatus so as to communicate between said plurality of second terminals and said plurality of information outputting apparatuses of said first terminal using the one of the languages specified by said second signal, when said first communication processing apparatus receives said second signal from said second communication processing apparatus.

* * * * *